Nov. 22, 1949     M. HATTAN     2,488,537
AUTOMATIC PARACHUTE RELEASE
Filed Nov. 9, 1948
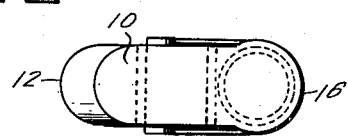
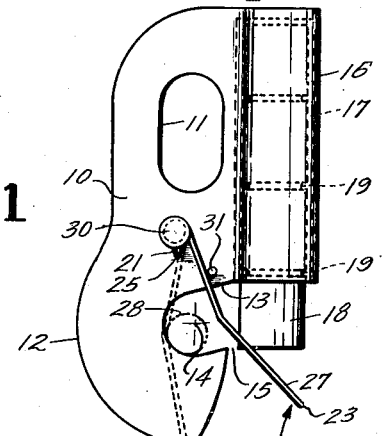
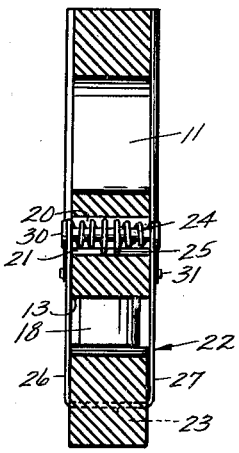
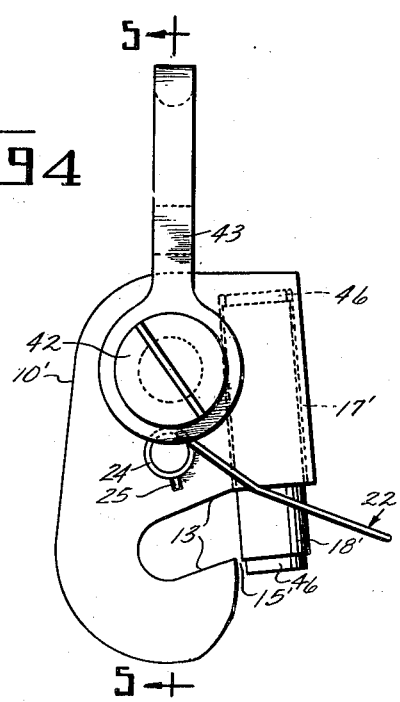
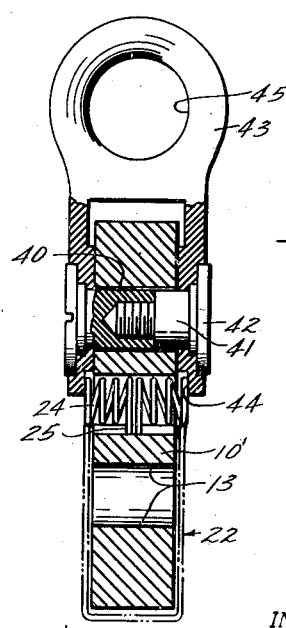
INVENTOR.
MARK HATTAN Patented Nov. 22, 1949

2,488,537

UNITED STATES PATENT OFFICE 2,488,537

AUTOMATIC PARACHUTE RELEASE

Mark Hattan, Pasadena, Calif.

Application November 9, 1948, Serial No. 59,123

4 Claims. (Cl. 294—83)

(Granted under the act of March 3, 1883, as amended April 30, 1928; 370 O. G. 757)

The invention described herein may be manufactured and used by or for the United States Government for governmental purposes without payment to me of any royalty thereon.

This invention relates to automatic parachute load release mechanisms and more particularly to a link means attachable in the parachute-to-load connection for automatically releasing the load from the parachute upon the load coming to rest on the earth after descent to avoid the load being dragged along the earth by the inflated parachute, yet which prevents inadvertent disconnection of the load and parachute during a predetermined time interval of the initial descent.

One great danger of injury to a parachutist or cargo in the descent by parachute is after the parachutist or cargo has reached the earth relieving the downward load from the parachute canopy while the canopy is still inflated. Directional wind will maintain the parachute canopy inflated which quite often pulls the parachute and its load along the earth in the direction of the wind until the canopy is "dumped" or the load is entirely released. Dragging a load along the earth often causes damage or injury particularly if the earth in the area contains obstacles as trees, rocks, etc.

In accordance with this invention, a link is attachable to the parachute shroud lines and has a hook on the lower end thereof for hooking the lines of the load, which load may be human or cargo. The hook has a delayed action mouth closing mechanism that prevents the load being released from the parachute until after a period of approximately seven seconds of applied load has elapsed but will act to open the mouth of the hook if the load remains for a period exceeding the time interval of approximately seven seconds such that the load may be disconnected immediately upon subsequent load relief. A spring biased ejection means on the hook insures separation of the load from the parachute when the mouth of the hook is open and the load is relieved. Such an automatic release of the load, which load may be human or inanimate, permits the load to rest where it first contacts the earth.

It is a primary object of this invention to provide a load releasing mechanism that automatically releases the load from a load-conveying device after a predetermined time interval of applied load upon the load being relieved from the load-conveying device.

It is another object of this invention to provide a link operable in the connection between a parachute and load that will automatically disconnect the load from the parachute upon load relief after a predetermined interval of time in which the load has been active on the parachute.

It is a further object of this invention to provide a link having an eyelet means on the upper end for connection to a parachute and a hook of slight bight angle on the lower end thereof with a spring ejector biased to resiliently extend outwardly across the hook toward the mouth thereof, the mouth of the hook being closable by a plunger slidable in an upwardly directed blind bore in the link body that falls from the blind bore by gravity at a retarded speed dependent on the leak passage between the plunger and the blind bore in order to prevent a connector of a load held against the bias of the spring ejector from being separated from the parachute until after a predetermined interval of time has elapsed with the load effectively pulling the parachute after which relief of the load, as by the load touching the earth, will permit the spring ejector to bias the load connected out of the hook disconnecting the load from the parachute.

These and other object and advantages will become more apparent to those skilled in the art as the description proceeds when taken in conjunction with the accompanying drawing illustrating preferred embodiments of the invention, in which:

Fig. 1 is a side elevational view of the automatic parachute load release link illustrating the invention;

Fig. 2 is a top view of Fig. 1;

Fig. 3 is a sectional view of the link device taken on the line 3—3 of Fig. 2 looking in the direction of the arrows;

Fig. 4 is a modification of the invention shown in Fig. 1; and

Fig. 5 is a sectional view taken along the line 5—5 of Fig. 4 looking in the direction of the arrows.

Referring now more particularly to Figs. 1, 2 and 3 in which like reference characters represent like parts, a link body member 10 has an elongated eyelet 11 formed in the upper end thereof and a hook portion 12 formed on the lower end thereof. The hook portion 12 is formed by a slot 13 cut at a slight angle downwardly in the side of the link body member forming a hook bight with the center of curvature 14 of the back wall of this slot being slightly offset toward the mouth 15 thereof with respect to the longitudinal vertical center line through the eyelet 11 to insure vertical orientation of the link under vertical loads. The portion of the link body member 10 above the mouth of the hook is enlarged longitudinally as shown at 16 to accommodate an upwardly extending blind bore 17 therein which opens adjacent to the top of the slot 13 of the hook.

Slidable within the blind bore 17 is a plunger 18 with cleaning grooves 19 thereon that is of slightly less diameter than blind bore 17 to retard the movement of the plunger 18 in or out of the blind bore 17 by reason of the dash-pot action resulting from air leakage between the plunger 18 and the bore wall to or from the upper end of the blind bore 17. Once the plunger 18 is inserted into the blind bore 17 to the end wall thereof, the plunger may drop out by its own weight after a time intervals depending on the clearance between the plunger 18 and the wall of the blind bore 17. For the present invention, this clearance is arranged to allow the plunger 18 to fall free of the blind bore in approximately seven seconds from its innermost position. The plunger 18 is of such a length that in its innermost position in the blind bore 17 there is a portion extending downwardly to close the mouth 15 of the hook.

Through the link body member 10 is an opening 20 having a channel 21 extending longitudinally thereof. A spring 22 has a U-shaped portion 23 and the ends thereof coiled at 24 which coils terminate in outstanding portions 25. The coiled portions 24 of the spring 22 are slidable in the opening 20 with the outstanding portions 25 resting in the channel 21. The coils 24 of the spring 22 are reversely wound to permit the coils of this spring to be inserted from opposite ends of the opening 20 and in order that the spring outer U-shaped end 23 be biased to sweep across the hook bight toward the mouth 15 thereof. A rivet as shown at 30 retains the spring ends in place. Stops 31 may be used to prevent the spring from unwinding in the absence of an element resting in the hook. While only one spring is shown used in this illustration of the invention, two may be used, as by having the lower arc of the U-shaped portion omitted, where desirable. The leg portions 26 and 27 of the spring U-shaped portion 23 are bent or curved in the direction of the mouth 15 of the hook, as seen in Fig. 1, to produce a lift on any link element in the slot 13 to relieve the friction of the link along the slightly inclined slot surface.

In its intended use in operation, the automatic release link of this invention is connected to the parachute shroud lines by the eyelet 11 as by a ring or the like (not shown). The load, whether human or inanimate, is ordinarily supported on a single ring element, shown in dotted lines 28, which ring is pushed inwardly in the slot 13 of the hook against the spring ejector 22. The plunger 18 is then inserted into the blind bore 17 to its limit. Spring 22 will push the load link 28 against the plunger 18 preventing it from dropping out of the bore 16 during the time in which the parachute and its load are being handled for air borne service since there would not be opposite pull on the link 10. In the event any momentary loads are imposed downward on the automatic link 10 in handling or during the shock of the parachute becoming inflated, the plunger would only slip a small amount due to its movement being retarded by the vacuum produced between the upper end of the plunger and the bore end relieved only by the leak passage around the plunger and blind bore wall. Upon the parachute becoming air borne and stable, the load link would be pulled downward into the bight of the slot 13 in the hook, as illustrated in dotted lines in Fig. 1, relieving the lateral pressure on the plunger 18 allowing it to continue its slide from the blind bore 17. The load will continue to hang from the hook due to the slight incline of the slot 13 but, upon the load touching the earth to relieve the load on the parachute, the spring 22 will force the load supporting link 28 out of the slot 13.

The purpose of delaying the action of the plunger 18 is to allow for short intervals of applied load on the parachute in handling or during the parachute opening process without endangering load disconnection, yet the time allowed for the plunger 18 to fall free of the blind bore 17 is not so long as to enable the load to reach the ground before the mouth of the hook is open. A time period of approximately seven seconds for the plunger 18 to fall from the blind bore 17 has been found suitable although the clearance of the plunger and the bore or a separate leak passage may be arranged to change the time interval to meet particular applications. The plunger 18 may also be attached to the link body member 10 as by a flexible element, for example a chain or a cord (not shown), to avoid loss of the plunger but such connections are within the ability of an ordinary person and will not be detailed herein.

Figs. 4 and 5 show a modification of the invention shown in Fig. 1 in which like parts have the same reference characters and similar parts are primed. Link body member 10' is slightly redesigned from that shown in Fig. 1 wherein the upwardly directed blind bore 17' is set at a slight angle from the vertical and in place of the elongated eyelet 11 of Fig. 1 there is a transverse drilled opening 40 through which extends a threadedly jointed bolt 41 having flanged heads 42. The flanged heads 42 of the bolt 41 retain a clevis 43 in swingable connection with the link body member 10'. The portion of the clevis 43 adjacent the link body member 10' is under-cut at 44 to ride over the ends of the spring 22 to prevent the coiled spring ends 24 from being separated from the link body member 10'. The shroud lines, or ring connecting the shroud lines, of a parachute may then be connected into an eyelet 45 of the clevis 43. The clevis 43 may be constructed with additional eyelets 45 where desirable. Any parachute oscillation occurring during descent in the direction of the hook which may prevent or interfere with load disconnection will be eliminated by the swingable joint of the clevis 43 permitting the hook to erect itself. The plunger 18' is slightly modified from that shown in Fig. 1 in that the ends thereof are reduced in diameter for a short distance at 46 for maintaining the bore 17' clean and to avoid swaging of the plunger cylindrical end portions upon being dropped on hard objects. Swaging of the end portions 46 of reduced diameter will not affect the interfitting relation of the plunger in the blind bore.

The use and operation of the modified link shown in Figs. 4 and 5 are substantially the same as that described for Figs. 1, 2 and 3 whereupon it is believed that its functions are clearly understood.

It is to be understood that many modifications and changes may be made in the structure and features of this invention without departing from the spirit and scope of this invention and I desire

I claim:

1. An automatic load releasing link for releasably connecting a load conveying device comprising; a link having an eyelet in its upper end and a hook on the lower end, the mouth of said hook being closable by a member slidable in an upwardly directed chamber in said link; and ejection means biased across said hook to the mouth thereof whereby a load supporting element placed in the bight of said hook against the bias of said ejection means will be forced against the hook closing member under no load conditions to hold said hook closing member in said chamber and will be pulled into the bight of said hook under a load to permit free fall of said hook closing member whereupon the load supporting element will be forced from said hook during a subsequent no load condition.

2. An automatic parachute load release device comprising; a link having an eyelet means at its upper end for connection to a parachute and a hook on the lower end thereof with a slightly inclined bight for connection to a parachute load supporting element; means for ejecting a load supporting element from said hook; and time delay hook closing means for retaining a load supporting element in said hook against said ejecting means, said time delay hook closing means comprising an upwardly directed blind bore in said link and a plunger slidable in said blind bore with a portion thereof extending over the mouth of said hook, the plunger being retained from freely falling by said ejecting means forcing a load supporting element against it under no load conditions and being free to fall from said bore under applied load of a load supporting element after a predetermined time delay to permit subsequent ejection of the load supporting element when the load is relieved.

3. An automatic parachute load releasing mechanism comprising; a link having an eyelet at the top for connection to a parachute and a hook at the bottom with a slightly inclined bight for connection to a load supporting link; spring means anchored at one end to said link and the other end biased to swing across said hook toward the mouth thereof for ejecting a load supporting link; and time-delay hook closing means operable to open said hook after a predetermined time from its initial preset position and in the absence of engagement by a load supporting link, a load supporting link adapted to be forced into engagement with said time-delay hook closing means by said spring ejecting means under no load conditions of the load supporting link and said spring ejecting means being forced away from the mouth of the hook under loaded conditions of a load supporting ring by the load supporting ring being pulled down the incline of said bight, said time delay hook closing means opening the mouth of the hook after a predetermined time interval in the absence of the engagement of a load supporting link whereby said spring ejecting means will eject the load supporting ring from said hook upon subsequent no load conditions.

4. An automatic parachute load release device comprising; a link having an eyelet in the upper end thereof for connection to the shroud lines of a parachute and a hook in the lower end thereof with the bight therein disposed at a slight angle downward from its mouth for connection to a parachute load supporting link member; a time-delay hook closing means, said time-delay hook closing means comprising a dashpot chamber upwardly disposed in said link directly over and in front of the mouth of said hook and a plunger slidably positionable in said dashpot chamber with an end thereof extending across the mouth of said hook, the plunger being droppable by gravity from said dashpot chamber after a predetermined time interval dependent on the dashpot leak; and spring means having one end anchored to said link above said hook and the other end swingably biased across said hook toward the mouth thereof to eject a parachute load supporting link member under no load conditions when the mouth of the hook is open and to hold a parachute load supporting link member against said plunger halting its dropping movement when the mouth of the hook is closed such that a parachute load will be disconnected from a parachute by said device only after a predetermined time interval of applied load and subsequent load relief.

MARK HATTAN.

No references cited.